United States Patent [19]

Whiteman

[11] Patent Number: 4,795,208

[45] Date of Patent: Jan. 3, 1989

[54] NET RESTRAINT SYSTEM

[75] Inventor: Paul L. Whiteman, Morgantown, Pa.

[73] Assignee: Morgan Corporation, Morgantown, Pa.

[21] Appl. No.: 86,881

[22] Filed: Aug. 19, 1987

[51] Int. Cl.⁴ .............................................. B60T 5/06
[52] U.S. Cl. ................................... 296/181; 296/183; 160/84.1
[58] Field of Search ....................... 296/181, 183, 143; 160/84.1

[56] References Cited

U.S. PATENT DOCUMENTS 4,545,611 10/1985 Broadbent ........................... 296/181
4,700,985 10/1987 Whitehead ........................... 296/181

FOREIGN PATENT DOCUMENTS 595829 7/1925 France ................................. 296/181
2174136 10/1986 United Kingdom ................ 296/181

Primary Examiner—Robert R. Song
Attorney, Agent, or Firm—Elliot M. Olstein; Raymond J. Lillie

[57] ABSTRACT

An improvement in a curtained door and net assembly wherein the net is contained in a curtain-sided van body. The improvement comprises a means for attaching the net to the curtained door. In a preferred embodiment, the improvement comprises a pocket means for containing the net which is attached to the curtained door.

9 Claims, 4 Drawing Sheets

NET RESTRAINT SYSTEM

This invention relates to a system for restraining a net within a vehicle body having a curtained door on at least one side of the vehicle body. More particularly, this application relates to an improvement in a curtained door and net assembly wherein the net is conveniently contained in a folded open position within the vehicle body when the net is not in use.

Curtained doors and various means for tensioning curtained doors are known in the art. Examples of van bodies that have curtained doors are disclosed in U.S. Pat. Nos. 3,709,552 and 4,545,611. The term "van body" is defined as the trailer portion of an articulated road vehicle, the body portion of a non-articulated road vehicle, a railroad car, or any body which supports cargo and has a roof which is disposed at the top of the body. One vertical tensioning mechanism, as disclosed in U.S. Pat. No. 3,709,552, comprises a bar curtained door attached to traveling means which fit inside a track. A strap, which can be adjusted, communicates with the top of the curtained door and also communicates with the bottom of the vehicle body by means of a hook attached to the bottom of the strap. The strap otherwise is unattached to the curtained door. The hook fits into a track located at the bottom of the truck body. The tension in the strap may be adjusted by means of buckles located in the strap. The horizontal tensioning is provided by a spool located at an end of the truck body. The winding of the curtain around the spool provides for the horizontal tensioning of the curtain. In order to open this door, however, one not only releases the horizontal tension, but also must remove the hook from its track at the bottom of the truck body, thereby releasing the vertical tensioning as well. Another van body, as disclosed in U.S. Pat. No. 4,545,611, has an upper runner and a lower hook which are located at the top and at the bottom, respectively, of a curtained door of the van body. Panels in the curtain are defined by rigid members housed in vertical sleeves. Horizontal tensioning is provided by an over-the-top latching mechanism.

Another example of a curtained door for a van body is described in U.S. patent application Ser. No. 068,179, filed June 29, 1987. This application discloses a curtained door having a curtain portion, with at least one latching means to secure the end plate and the door to the vehicle body. The curtained door has upper and lower roller brackets, each containing rollers, which roll in sets of upper and lower roller tracks. Connecting each upper and lower roller bracket in each set is a vertical reinforcing web or strip which fits in the upper and lower roller bracket and a desired length of said web or strip is passed through a buckle in order to maintain proper vertical tensioning of the web or strip and of the curtained door. The web or strip is contained within a pocket which is located between the upper and lower roller brackets and sewn to the curtain portion of the curtained door, or so-called "curtain-sider".

In connection with curtained doors for van bodies such as those described above, it is possible to use a net within these vehicle bodies. The net, which is located inboard of the curtained door, may be movable within a traveling means such as a track by means such as rollers. The net is usually located next to a door of the vehicle body near a side or sides, or near the front or rear of the vehicle body. The net is deployed when one wishes to load the truck body or other vehicle body with small packages or engage in other kinds of bulk loading wherein the packages or other materials being loaded are likely to be jarred while the vehicle is in motion. The net, therefore, serves to prevent packages or other materials from hitting against the sides, front, rear, or doors of the vehicle body, thereby lessening the possibility of damage to the packages or material while they are in transit.

When one wishes to load a vehicle body with large containers or materials on pallets, the net, if present in a vehicle body, need not be used. If the net does not need to be used, then it must be stored somewhere within the vehicle body. A common method of storing the net is to place the net in a corner of the vehicle body. The net may also be restrained by a strap or other type of restraining means.

This method of storing a net within a vehicle body has disadvantages. Space must be provided for storage of the net. The storage space provided for the net may interfere with the loading of cargo into the vehicle body in that the net may occupy much needed loading space. In addition, in some vehicle bodies, it may be difficult to store the net securely, thus making the net capable of being jarred quite easily from its storage space if adverse road conditions are encountered.

Applicant has overcome these disadvantages by providing a new system for containing a net with a curtain-sided vehicle body. Applicant's invention is an improvement in a curtained door and net assembly. Applicant's invention is a curtain-sided van body comprising a curtained door and net for at least one side of the van body, means for movably supporting the curtained door and net whereby the curtained door and net may be moved between a closed position for closing at least one side of the van body and a folded open position for opening at least one side of the van body, and means for attaching the net to the curtained door, whereby the attaching means attaches the net to the curtained door for movement with said curtained door for maintaining the net in a folded open position when the curtained door is in a folded open position. In accordance with an aspect of the present invention, the attaching means maintains the net in a folded open position during movement of the curtained door between a folded open position and a closed position. In a preferred embodiment, there is provided a pocket means for containing the net, said pocket means being attached to the curtained door.

The pocket means may have at least two ends and may be permanently attached to the curtained door at one end, and the other end is detachable from the curtained door. In a preferred embodiment, the curtained door and the net run in separate track means. Most preferably, these separate track means for the curtained door and the net lie in planes substantially parallel to each other.

In another preferred embodiment, the pocket means has at least one side and contains reinforcing means interspersed throughout at least one side of the pocket means. Each of the reinforcing means may be in the form of a spring leaf. The spring leaves provide for proper tensioning of the pocket and the curtained door when the curtained door is in an open position. The spring leaves prevent inward bulging of the portion of the curtained door which is opposite the net which is between the pocket means and the curtained door. This enables one to open the curtained door to its fullest extent while the net is not being deployed and remains within the pocket formed by the pocket means and the curtained door.

Preferably, the pocket means is located adjacent to one end of the curtained door, and a first end of the pocket means is sewn or sealed onto the curtained door. The second end is detachable from the curtained door by fastening means which are located on the second end of the pocket means and also on an end plate of the curtained door. The fastening means may be of a knob and eye type arrangement wherein knobs which are rotatably mounted on the end plate of the curtained door are inserted through eyelets on the second end of the pocket means. After the knobs are inserted through the eyelets, they are rotated so as to secure the second end of the pocket means to the end plate of the curtained door. The knobs also may be mounted on the curtain portion of the door as well.

The invention will now be described with respect to the drawings, wherein.

Figure 1:
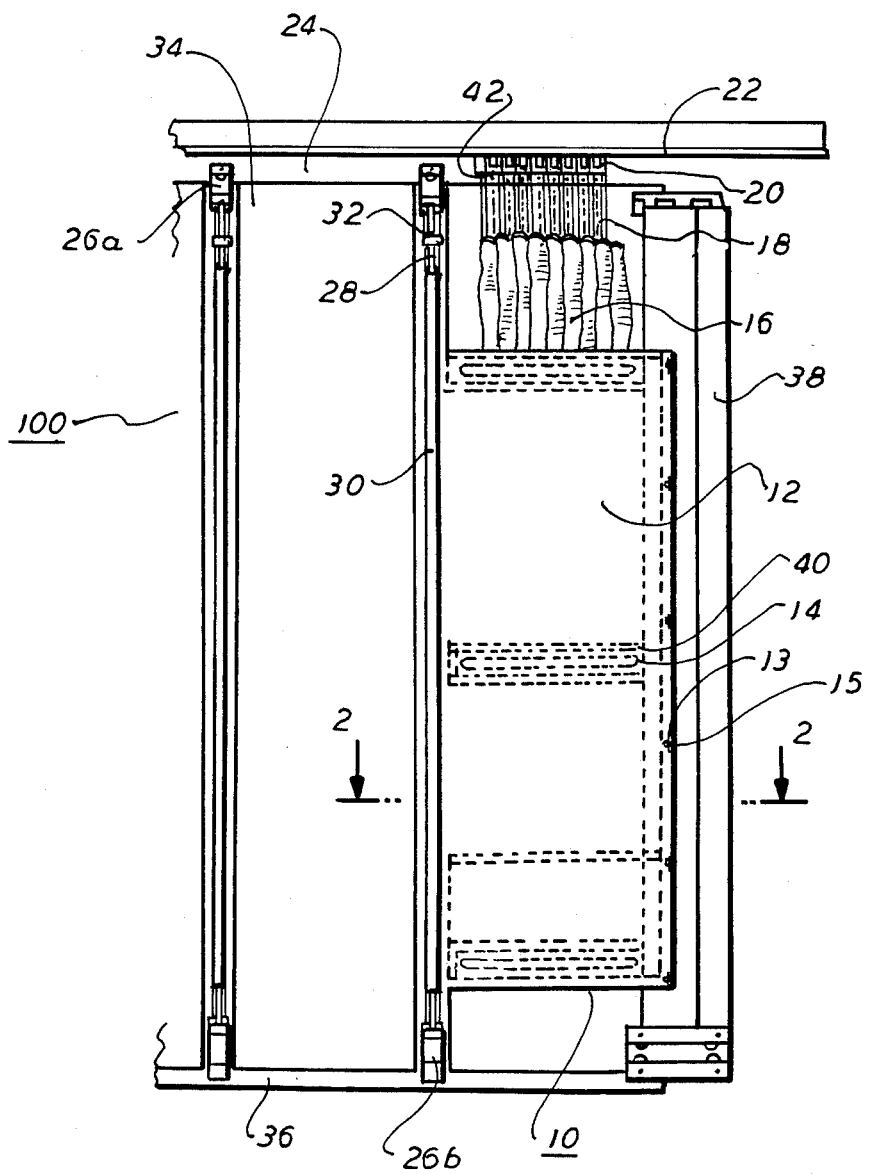
FIG. 1 is a front view of an embodiment of a pocket means and a curtained door in accordance with an embodiment of the present invention.
Figure 2:
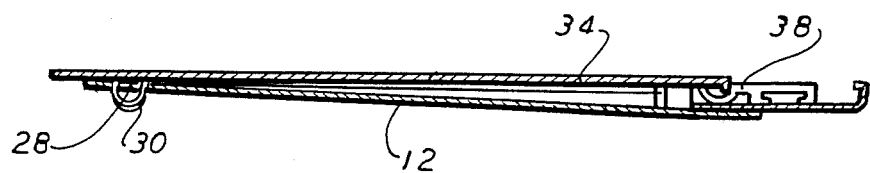
FIG. 2 is a cross-sectional view of the curtained door and pocket means.
Figure 3:
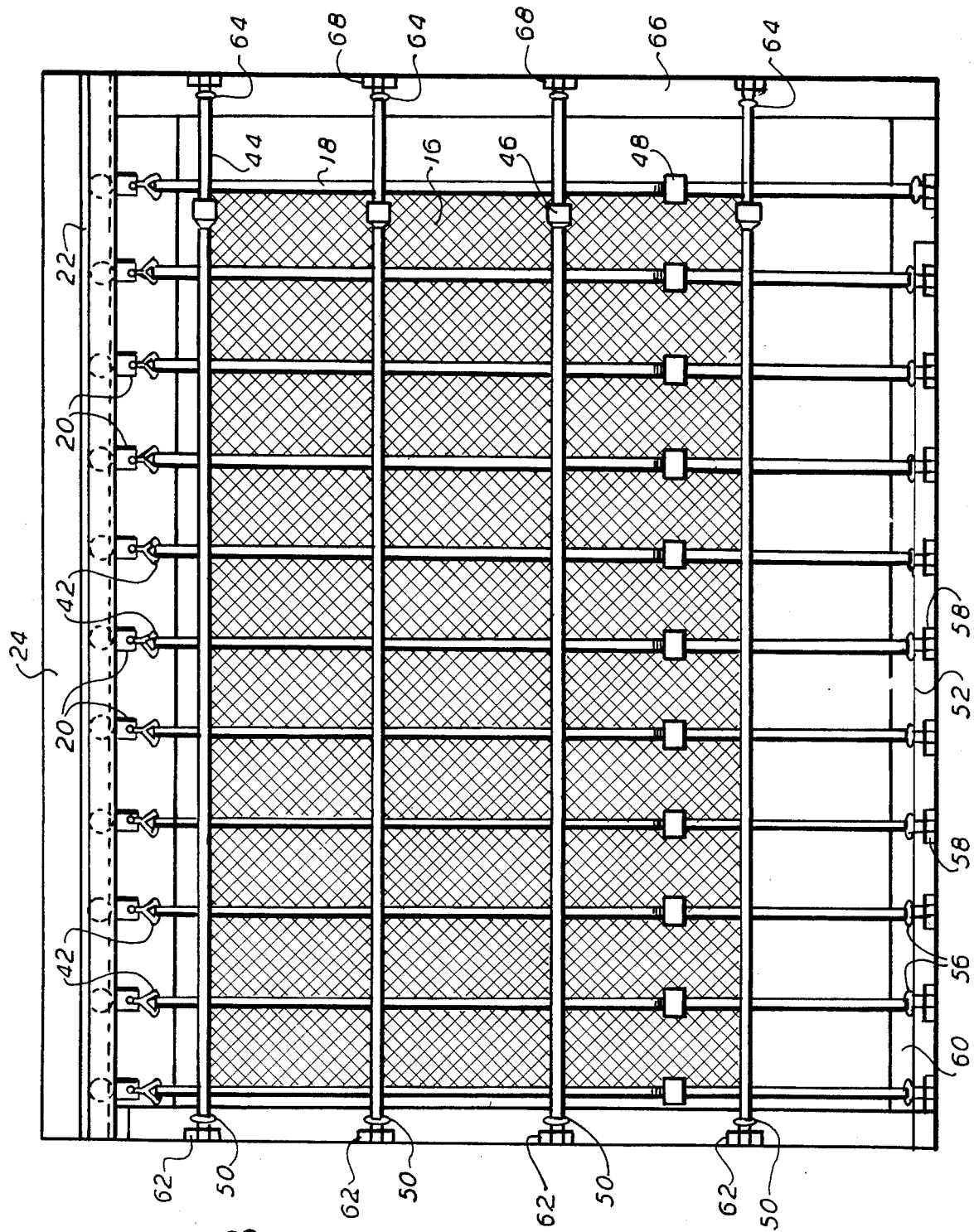
FIG. 3 is a view of the net when fully deployed.
Figure 4:
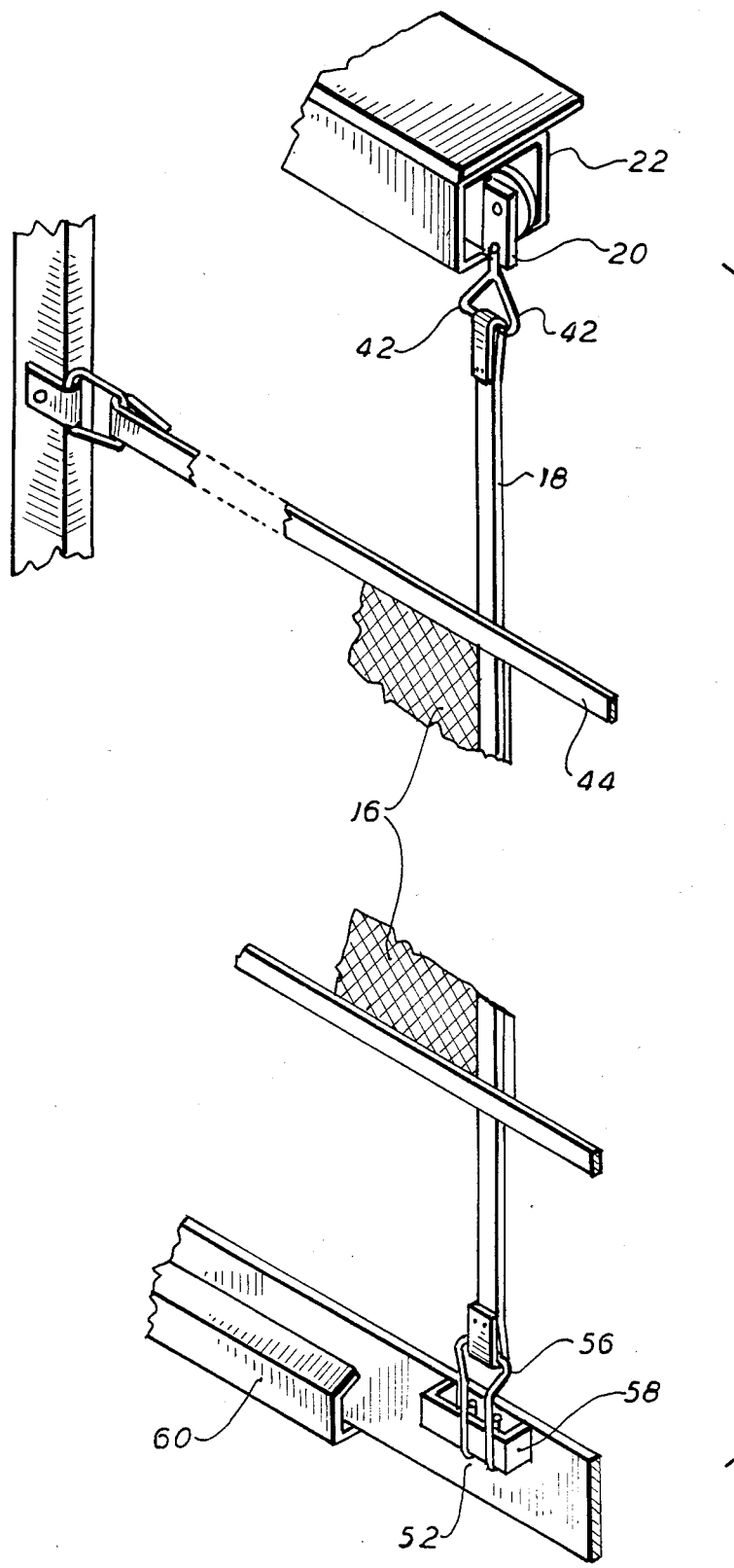
FIG. 4 is a magnified broken-away view of an embodiment of the net attachments at the top and at the bottom of a vehicle body.
Figure 5:
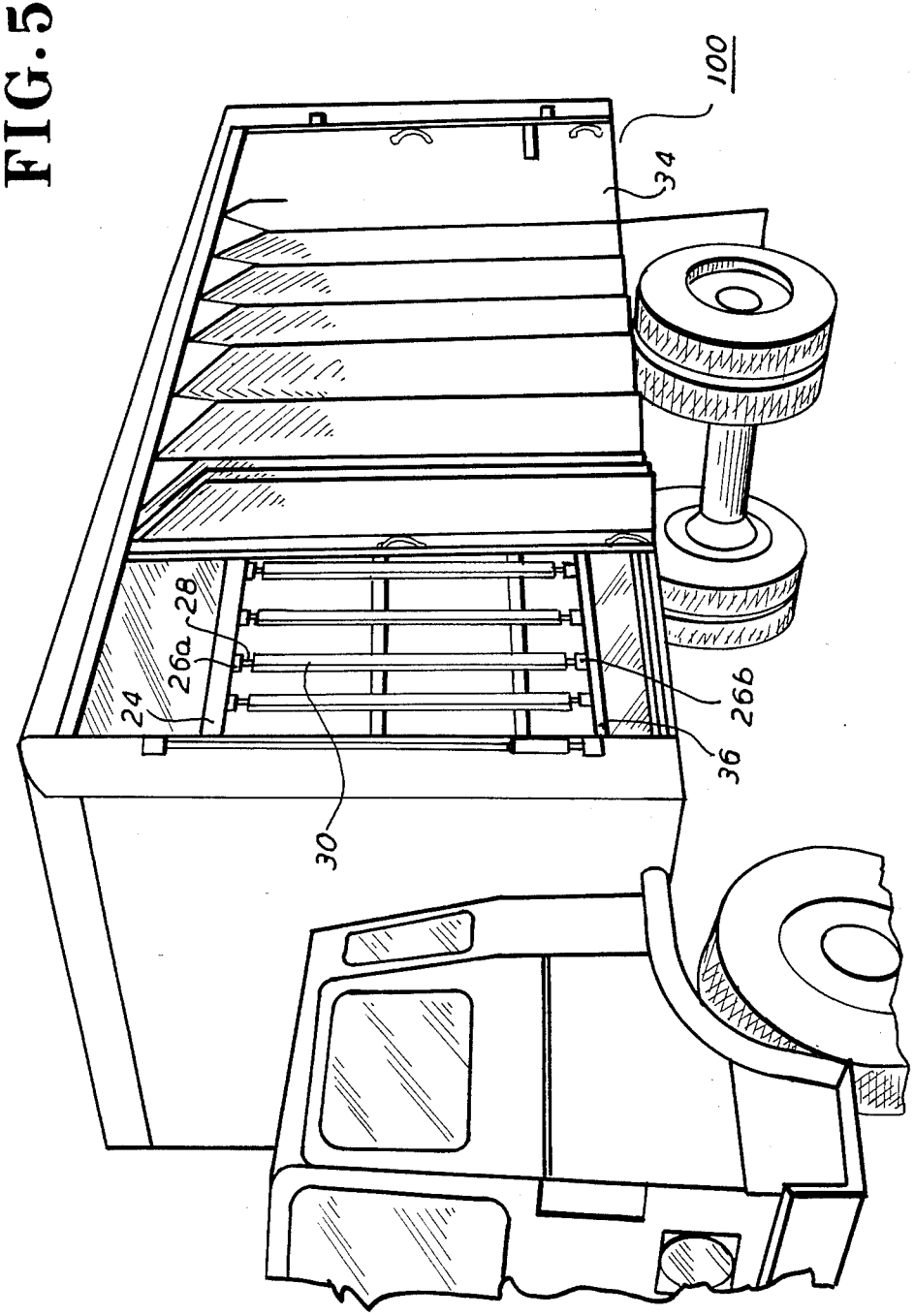
FIG. 5 is a side view of a van body showing a curtained body.

Referring now to the drawings, the embodiment of the curtained door and net assembly shown comprises a curtained door 100 having a curtain portion 34, a net 16, and means for connecting curtained door 100 with net 16, which in the preferred embodiment shown comprises a pocket means 10. The curtained door may include roller brackets 26a and 26b which hold rollers (not shown) which run in roller tracks 24 and 36. Passing through roller brackets 26a and 26b is a web which includes a strap 28 which is contained in pocket 30. Strap 28 also permanently attached to webbing which forms a part of the curtain portion 34, and also passes through buckle 32. The strap and roller bracket assembly, as well as the buckle, serves as a vertical tensioning means for the curtain portion 34. A plurality of these vertical tensioning means are located throughout the curtained door.

At least one end of the curtain portion 34 of the curtained door is attached to an end plate 38. When the curtained door is closed, a latching means (not shown), engages the end plate 38 to provide for horizontal tensioning of the curtained door.

The net 16 is attached by vertical reinforcing webs which in this embodiment are in the form of straps 18 which are passed through hooks 42 which are attached to roller brackets 20. Roller brackets 20 hold rollers (not shown) which run in net roller track 22. Net roller track 22 is substantially parallel to roller track 24, thereby allowing net 16 and curtain portion 34 to lie in substantially parallel planes when net 16 is deployed, although net 16 can also be disposed at a small angle to the vertical when it is deployed.

Vertical straps 18 are sewn to net 16 for most of the height of net 16. These vertical straps 18 are passed thorough buckles 48. At the bottom of each vertical strap 18, there is a hook 56 through which each vertical strap 18 is inserted. The vertical strap 18 passes thorugh hook 56 and then upwardly back through buckle 48. Hook 56 fits inside bracket 58 which is mounted, preferably by welds, upon channel 52 which is located perpendicular to the floor of the vehicle body. There may also be attached to channel 52 a reinforcment means 60.

It will be noted that there are a plurality of hooks 56 which fit into a plurality of brackets 58 when net 16 is deployed. When net 16 is fully deployed, one can adjust the vertical tension of net 16 by passing a desired length of strap 18 through buckle 48.

Running horizontally across net 16 are horizontal reinforcing webs shown in this embodiment as straps 44. These horizontal straps 44 are also sewn to net 16 for most of the length of net 16. At the end of horizontal straps 44 which in this embodiment are nearest the rear of the vehicle body, the straps are passed through hooks 50. At the end nearest the front of the vehicle body are hooks 64 buckles 46 through which straps 44 are passed as well.

When the net is fully deployed, hooks 50 are fitted into brackets 62 which are mounted on a vertical rear frame post 54 which is near a corner of a vehicle body. Hooks 64 are fitted into brackets 68 which are mounted on a vertical front frame post 66, which is located near another corner of the vehicle body. The horizontal tensioning of net 16 may be adjusted by passing a desired length of horizontal strap 44 through buckle 46.

The pocket means 10 is comprised of a pocket portion 12, which is reinforced with spring leaf means 14 contained within horizontal sleeves 40. For purposes of illustration, three spring leaf means 14 are shown, but the number of spring leaf means 14 which reinforce pocket 12 may vary. One end of pocket 12 is permanently attached to the curtained door and the other end is detachably secured by a fastening means. In the embodiment shown, the fastening means comprise eyelets 13 at one end of pocket 12, and knob means 15, which are rotatably mounted on the end plate 38 of the curtained door. The knob means may, in alternative embodiments, be mounted on other portions of the curtained door 100 as well, such as on curtain portion 34.

As shown in the drawings, the pocket 12 is permanently attached to the curtained door by sewing, sealing, or other means known in the art. In the embodiment shown the pocket 12 is permanently attached to pocket 30 containing strap 28. The pocket 12, however, may be attached to other portions of the curtained door as well, such as the curtain portion 34. In the embodiment shown, the section of curtain portion 34 which is opposite pocket 12 in effect functions as a side of the pocket means.

It can also be seen in FIG. 1 of the drawings that when the net 16 is not deployed, pocket 12 disposes net 16 between pocket 12 and the curtain portion 34 of the curtained door 100, and net 16 is maintained in a furled position. In order to deploy the net 16, one turns knobs 15 mounted on end plate 38 so that eyelets 13 are able to be disengaged from knobs 15 so as to open pocket 12. The pocket 12 can then be pulled back and the net 16 is then withdrawn from the pocket 12 and placed in front of pocket 12. Net 16 may then be rolled along net roller track 22 so as to become fully deployed. In most cases, the bottom portion of the net 16 may be fastened along a rod, track or channel means when the net 16 is deployed. When the net 16 is not deployed, any fastening or tensioning means attached to the net 16, such as hooks 56 and 50 and buckles 48 and 46, may also be kept inside pocket 12 as well.

In the embodiment shown, net 16 may be deployed after net 16 is removed from pocket 12. As above stated, the net 16 is rolled along net roller track 22 toward the rear of the vehicle body so as to extend net 16 fully toward the rear of the vehicle body. Once the net 16 is fully extended, one then inserts hooks 56 located at the bottom of vertical straps 18 into brackets 58 which are attached to channel 52, inserts hooks 50 into brackets 62 which are attached to rear frame post 54 and inserts hooks 64 into brackets 68 which are attached to front frame post 66. The vertical tensioning is then adjusted by adjusting the length of vertical straps 18 which pass through buckles 48. The horizontal tensioning is then adjusted by ajusting the length of horizontal straps 44 which pass through buckles 46. When on wishes to return net 16 to the inside of pocket 12, one merely removes hooks 56 from brackets 58, removes hooks 50 from brackets 62, and removes hooks 64 from brackets 68, and then rolls net 16 along net roller track 22 toward the front of the vehicle body. Pocket 12 is then opened as above described so that net 16 can be placed between pocket 12 and curtain portion 34 of the curtained door 100. Then one engages eyelets 13 as pocket 12 with knobs 15 mounted on end plate 38 and then turns knobs 15 so that eyelets 13 cannot become disengaged from knobs 15, thereby securing the pocket 12 and keeping net 16 disposed between pocket 12 and the curtain portion 34 of the curtained door. In an alternative embodiment, a pouch (not shown) may be attached, preferably by being sewn, on the inside bottom portion of pocket 12, and thereby running along the bottom of pocket 12. The pouch is for containing hooks 56 and buckles 48 of net 16 so as to prevent hooks 56 and buckles 48 from rubbing into or puncturing the curtain portion 34 of curtained door 100.

As stated above, net 16 is normally deployed when one is engaged in bulk loading of small packages. The net 16 prevents the curtain portion 34 of the curtained door from being damaged by shifting packages while the packages are in transit. When one is loading large containers or containers on pallets, the net 16 is not deployed but remains within pocket 12. The pocket 12 is reinforced with spring leaf means 14. Each spring leaf means 14 is contained within a horizontal sleeve 40. The spring leaf means 14 provide for proper tensioning of pocket 12 and help to control movement of the net 16 and of the pocket 12 when the curtained door is being opened. When the curtained door is being opened while the net 16 is contained in pocket 12, net 16 and curtained portion 34 of the curtained door are being moved simultaneously toward one end of the vehicle body, with net 16 traveling along net roller track 22 and the curtained door traveling along roller tracks 24 and 36. While the door is being opened, the spring leaf means 14 maintain the proper tensioning of pocket 12 and prevent unwanted inward bunching of net 16 and curtain portion 34 of the curtained door. In a preferred embodiment, pocket 12 contains three spring leaf means 14, each spring leaf means 14 being made of a durable metal such as steel and being 20" long and 1¼" wide. Although a preferred embodiment of spring leaf means 14 has been described, the spring leaf means 14 may be made of any acceptable reinforcing material and may be of any size which will provide adequate reinforcement of pocket 12.

In alternative embodiments, other attachment means for attaching the net to the curtained door may be used. For example, a series of strap means located at one end of the curtained door may maintain the net in a folded open position, as opposed to accomplishing the same with a pocket. In another example, attachment means such as a strap may be passed through holes in the net, to attach the net to the curtained door whereby the net moves simultaneously with the curtained door between a folded open position and an unfolded closed position. These straps would be located at at least one end of the curtained door. In this embodiment, the net is maintained in a folded open position when the curtained door is in a folded open postion, and is maintained in an unfolded closed position when the curtained door is in an unfolded closed position. Thus, in effect, in opening the curtained door the net is opened and simultaneously folded with the curtain to an open position.

It is to be understood, however, that the invention is not to be limited to the specific embodiments described above. Various means for connecting the net with the curtained door, other than a pocket or straps, may be employed. Various means of attaching the pocket to the curtained door, for example, may be made within the scope of the invention. Reinforcement means for the pocket other than spring leaf means may be used. The invention may be practiced other than as particularly described and still be within the scope of the accompanying claims.

What is claimed is:

1. A curtain-sided van body comprising:
   a curtained door for at least one side of said van body;
   a net for said at least one side;
   means for movably supporting said curtained door and said net whereby said curtained door and said net may be moved between a closed position for closing said at least one side of said van body and a folded open position for opening said at least one side of said van body;
   attaching means for attaching said net to said curtained door, said attaching means attaching said net to said curtained door for movement with said curtained door, said attaching means maintaining said net in a folded open position when said curtained door is in a folded open position.

2. The curtain-sided van body of claim 1 wherein said attaching means maintains said net in a folded open position during movement of said curtained door between a folded open position and a closed position.

3. The curtain-sided van body of claim 2 wherein said attaching means comprises a pocket means for containing said net, said pocket means being attached to said curtained door.

4. The curtain-sided van body of claim 3 wherein said pocket means has at least two ends and is permanently attached to the curtained door at one end of the pocket means, and the other end of said pocket means is detachable from said curtained door.

5. The curtain-sided van body of claim 3 wherein said pocket means includes reinforcement means contained with said pocket means.

6. The curtain-sided van body of claim 5 wherein said reinforcement means comprises at least one spring leaf means.

7. The curtain-sided van body of claim 1 wherein said means for supporting said curtained door and said net comprise separate track means for said net and said curtained door.

8. The curtain-sided van body of claim 7 wherein said separate track means lie in planes substantially parallel to each other.

9. The curtain-sided van body of claim 1 wherein said attaching means maintains said net in a folded open position when said curtained door is in a folded open position and maintains said net in an unfolded closed position when the curtained door is in an unfolded closed position, whereby said net moves simultaneously with the curtained door between a folded open position and an unfolded closed position.

* * * * *